United States Patent
Bechtold et al.

(10) Patent No.: US 6,312,583 B1
(45) Date of Patent: Nov. 6, 2001

(54) PROCESS FOR REDUCING SULPHIDE DYESTUFFS

(75) Inventors: Thomas Bechtold, Dornbirn; Eduard Burtscher, Bludenz, both of (AT)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/486,708

(22) PCT Filed: Sep. 1, 1998

(86) PCT No.: PCT/AT98/00207

§ 371 Date: Mar. 6, 2000

§ 102(e) Date: Mar. 6, 2000

(87) PCT Pub. No.: WO99/11716

PCT Pub. Date: Mar. 11, 1999

(30) Foreign Application Priority Data

Sep. 4, 1998 (AT) .................................................. 1478/97

(51) Int. Cl.[7] ................ C25B 3/00; C25B 1/00
(52) U.S. Cl. ........................................... 205/444; 205/554
(58) Field of Search ................................... 205/444, 554; 204/134

(56) References Cited

U.S. PATENT DOCUMENTS

| 3,640,803 | * | 2/1972 | Frind et al. ............................. 205/444 |
| 3,953,307 | * | 4/1976 | Supanekar et al. ..................... 204/134 |
| 5,244,549 | * | 9/1993 | Bechtold ................................. 204/134 |

FOREIGN PATENT DOCUMENTS

| 1906083 A | * | 8/1970 | (DE) . |
| 9015182 A | * | 12/1990 | (WO) . |

\* cited by examiner

*Primary Examiner*—Edna Wong
*Assistant Examiner*—Thao Tran
(74) *Attorney, Agent, or Firm*—Oblon, Spivak, McClelland, Maier & Neustadt, P.C.

(57) ABSTRACT

In a method of producing reduced sulfur dyes, the improvement comprising cathodically reducing a sulfur dye to produce at least 150 Ah.kg$^{-1}$ of reduction equivalents with respect to the solid dye, wherein at least 50 Ah.kg$^{-1}$ is introduced by cathodic reduction.

11 Claims, 1 Drawing Sheet

PROCESS FOR REDUCING SULPHIDE DYESTUFFS

Among the sulphur dyes group, there are grouped together dyes with the same principles of manufacture and the same manner of dyeing. Sulphur dyes are produced by reacting suitable organic substances with sulphur, alkali sulphides or alkali polysulphides. The products produced contain recurring organic structural elements which are bonded together by bisulphide groups. The chemical constitution is not reliably known in the majority of cases.

For the purpose of dyeing, the sulphur dyes are reduced using different reduction processes. With this, a portion of the disulfide bridges are split reductively (equation 1), the products produced have lower molar masses, are soluble in aqueous alkaline solution, and can be used for the purpose of dyeing as they also have an affinity to fibres, for example, to cellulose fibres.

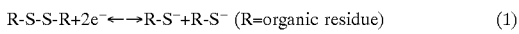

$$R\text{-}S\text{-}S\text{-}R + 2e^- \leftrightarrow R\text{-}S^- + R\text{-}S^- \quad (R = \text{organic residue}) \qquad (1)$$

As, in the dyeing process, the dye bath containing the reduced dye has to be protected from undesired oxidation of the dye by air, reduction chemicals are always also added to the dye bath. If both the reduction of the dye and the prevention of oxidation by the air are to be obtained by the addition of reduction chemicals, very large quantities of reduction chemicals are needed, which give rise to corresponding expenses in both the dyeing process and the disposal of the waste water from the dyeing which is used. Some improvement is obtained with the process according to DE-OS 1 906 083, which recommends dye reduction with the aid of cathodic reduction in aqueous solution at current densities between 5 mA.cm$^{-2}$ and 50 mA.cm$^{-2}$.

Probably because of the high current density used, the known process must be interrupted because of the development of hydrogen when the concentration of reduction equivalents in the solution is somewhere in the region of 70–150 Ah.kg$^{-1}$. Although the solution would be useable, it would be partially oxidised by the oxygen occurring in the dyeing process. A chemical reduction agent is therefore added to the electrochemically reduced dye, which agent in total makes up half of the entire reduction equivalent. While with the process according to DE-OS 1 906 083 approximately half of the chemical reduction agent can consequently be dispensed with, this process cannot be used with the commercially available pre-reduced sulphur dyes, which are normally treated in the dye solution with further stabilising reduction agents. With the content of reduction equivalents obtained through pre-reduction, immediate development of hydrogen would occur.

While the prior publication described describes process times lasting several hours, and therefore refers to possibly increasing the current strengths used, in order to reduce this time, the invention is based on the unexpected recognition that by means of a significant reduction in the current density on the cathodes, the electrochemical reduction can be continued far enough that even after oxidation by the oxygen occurring during the dyeing process, the dye is still sufficiently reduced.

The invention thus relates to a process for reduction of sulphur dyes to an analytically determinable concentration of at least 150 Ah.kg$^{-1}$ of reduction equivalents in the solution, in relation to the solid dye, wherein at least 50 Ah.kg$^{-1}$ can be introduced by cathodic reduction. The process has a current density of between 0.5 mA cm$^{-2}$ and 5 mA.cm-2, preferably between 0.8 mA.cm$^{-2}$ and 2 mA.cm$^{-2}$ with a dyestuff concentration of 100 g.l$^{-1}$. At least 70% of the reduction equivalents, preferably substantially all of the reduction equivalents are introduced electrochemically.

The known process is improved in that with a concentration of reduction equivalents over 150 Ah.kg$^{-1}$, cathodic reduction takes place. The determination of the equivalent quantity of reduction agent can take place by means of potentiometric titration of the electrolyte with iodine solution and calculation using Faraday's law. The quantity of reduction agent present after electrolysis in the catholyte can also be determined by measurement of the charge which has flowed.

With sulphur black (Diresul 4G-EV fl., Sulfur black 1, Colour Index 53185), a typical instance of the class of sulphur dyes, this value is where there is at least 180 Ah.kg$^{-1}$ of solid dye. If the dyes are already present in a reduced form, which can be obtained, for example, by chemical additives during manufacture of the product, the charge which has to be applied additionally through cathodic reduction reduces. Any skilled person is capable of determining the degree of reduction already present by analytical testing of the condition of the initial dye, and of calculating from this the reduction equivalent still to be produced by cathodic reduction, such that overall reduction equivalents of at least 180 Ah.kg$^{-1}$ of solid dye are present. In the calculation, the concentration of dye in the technical product must also be taken into consideration, as numerous technical commercial products contain only a specific amount of mass of solid dye because of regulating agents (for example, salts, dispersing agents) or in the case of the manufacturing of liquid products, because of their preparation.

BRIEF DESCRIPTION OF THE DRAWINGS

In the drawing, there is shown schematically an apparatus for implementing the process according to the invention. As such apparatuses are known (see AT 402 946 B), a brief description thereof is sufficient.

In the drawing, the power supply is labelled 1, the cathodes 2, and the anodes 3. The use of the cation exchanging membrane 6 which separates the anolyte 4 and catholyte 5 is fundamental. The sensor 7 is for measurement of potential in the dye solution, the sensor 8 is for temperature measurement. The container 10 forms the catholyte reservoir in which the dyeing procedure can also take place. The catholyte is reduced by the circulation flow in the circuit 9.

Figure 1:
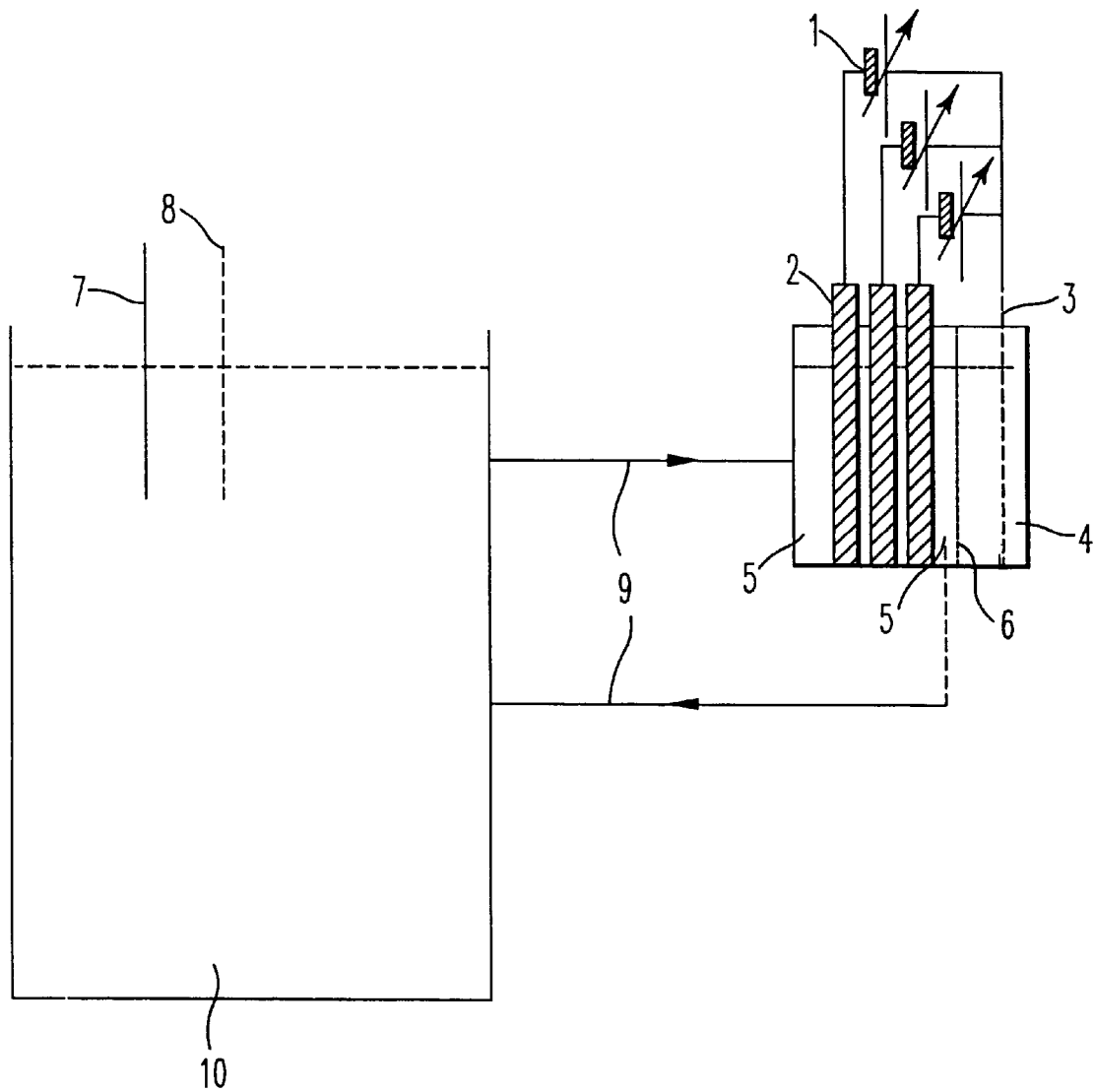

Hereinafter, two examples of application are described, which are implemented with the apparatus shown.

EXAMPLE OF APPLICATION 1

In a multi cathode cell divided by a cation exchange membrane according to AT patent 402.946, a dispersion of 200 ml.l$^{-1}$ of Diresul 4G-EV fl. (approximately 40–50% dispersion of Sulfur black 1, Colour index 53185), 4 ml.l$^{-1}$ of 50% caustic soda, and 2 ml.l$^{-1}$ of wetting agent is electrolysed at 40–50° C. Caustic soda (40 g.l$^{-1}$NaOH) is used as the anolyte. The electrolysis is electrolysed for 40 mins with a cathodic current density of 0.6–0.7 mA.cm$^{-2}$, and subsequently reduced for 130 mins at a current density of 1 mA.cm$^{-2}$. The reduction equivalent content which can be determined by titration following the electrolysis is 0.83 mol.l$^{-1}$, which corresponds to a charge of 222 Ah per kg of dye. The solution manufactured in this way can be used without any further additives for dyeing purposes.

EXAMPLE OF APPLICATION 2

A solution of 20 ml.l$^{-1}$ of Diresul RDT fl. (approximately 40–50% solution of Leuco Sulfur Black 1) is electrolysed in the presence of 20 g.l$^{-1}$ Na2SO4 anhydrously at pH 12 and at room temperature in an installation according to example of application 1. Caustic soda (40 g.l$^{-1}$ NaOH) is used again as the anolyte. The solution of reduced dye has, with iodometric titration at the beginning of the electrolysis, a content of reduction equivalents of 0.075 mol.l$^{-1}$. The cathodic reduction is carried out at a current density of 0.26 mA.cm$^{-2}$, in accordance with the low content of dye in the catholyte. Electrolysis is ended when there is an analytically determined content of 0.125 mol.l$^{-1}$. The solution now contains a reduction equivalent content of 335 Ah to 1 kg of solid dye. The solution of the dye manufactured in this way can be used directly for dyeing.

By means of the invention described, it is possible to reduce sulphur dyes without using chemical reduction agents to the extent that the oxidation resulting during the dyeing procedure is also taken into consideration. Moreover, the invention allows sulphur dyes already pre-reduced chemically to be further processed electrochemically for the first time, and in this way the amount of chemicals required overall to be reduced.

What is claimed is:

1. A process for producing reduced sulfur dyes comprising:
    cathodically reducing unreduced sulfur dyes or pre-reduced sulfur dyes, wherein a current density of between 0.5 mA.cm$^{-2}$ and 5 mA.cm$^{-2}$ at a dyestuff concentration of 100 g.l$^{-1}$ is used, wherein an analytically determinable concentration of reduction equivalents of at least 150 Ah.kg$^{-1}$ with respect to the sulfur dyes is produced, and wherein at least 50 Ah.kg$^{-1}$ of reduction equivalents are produced by cathodic reduction.

2. Process according to claim 1, wherein at least 70% of the reduction equivalents are introduced by cathodic reduction.

3. Process according to claim 1, wherein substantially all of the reduction equivalents are introduced by cathodic reduction.

4. Process according to claim 1, wherein the electrolysis cell used contains a three-dimensional electrode as the cathode.

5. Process according to claim 1, wherein the electrolysis cell used contains several cathodes, which are operated at a potential different to that of a common anode.

6. Process according to claim 1, wherein the catholyte contains between 10 g.l$^{-1}$ and 500 g.l$^{-1}$ of dye.

7. Process according to claim 1, wherein a solution of an alkali salt or of an alkali hydroxide is used as a base electrolyte.

8. The process according to claim 1, wherein unreduced sulfur dyes are used.

9. The process according to claim 1, wherein pre-reduced sulfur dyes are used.

10. The process according to claim 1, where an analytically determinable concentration of reduction equivalents with respect to the solid dye is over 180 Ah.kg$^{-1}$.

11. The process according to claim 1, wherein said current density is between 0.8 mA.cm$^{-2}$ and 2 mA.cm$^{-2}$ at a dyestuff concentration of 100 g.l$^{-1}$.

* * * * *

UNITED STATES PATENT AND TRADEMARK OFFICE
CERTIFICATE OF CORRECTION

PATENT NO. : 6,312,583 B1
DATED : November 6, 2001
INVENTOR(S) : Bechtold et al.

It is certified that error appears in the above-identified patent and that said Letters Patent is hereby corrected as shown below:

<u>Title page</u>,
Item [30], the Foreign Application Priority Data should read:
-- [30]      Foreign Application Priority Data
  Sep. 4, 1997   (AT) ............................................. A 1478/97 --

Signed and Sealed this

Twenty-fifth Day of June, 2002

Attest:

Attesting Officer

JAMES E. ROGAN
*Director of the United States Patent and Trademark Office*